Patented Aug. 12, 1952

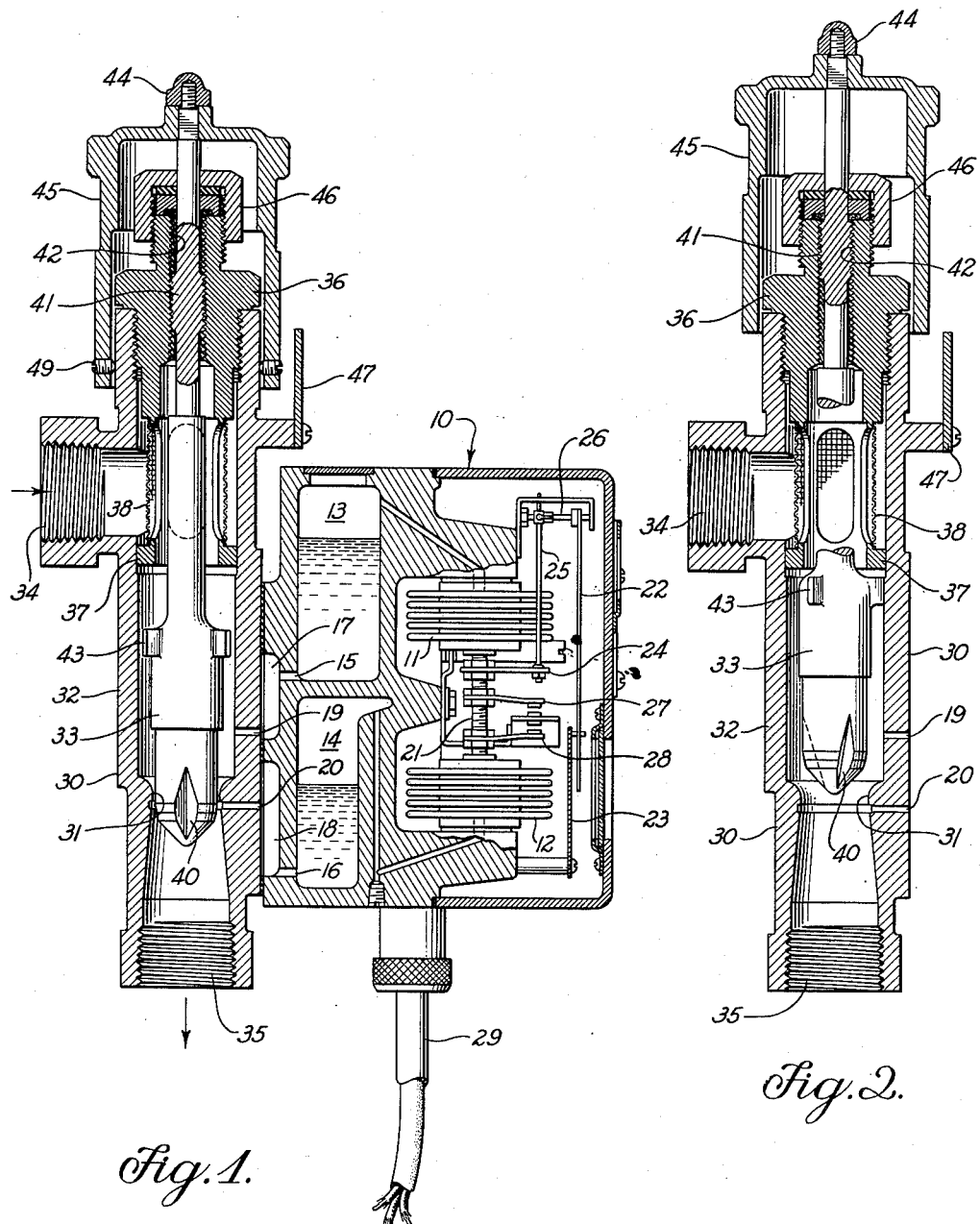

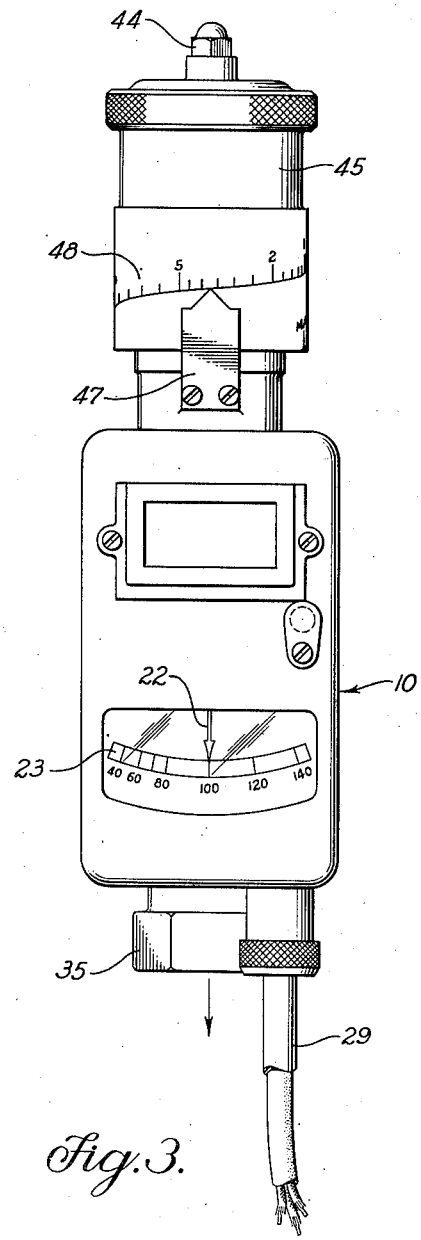
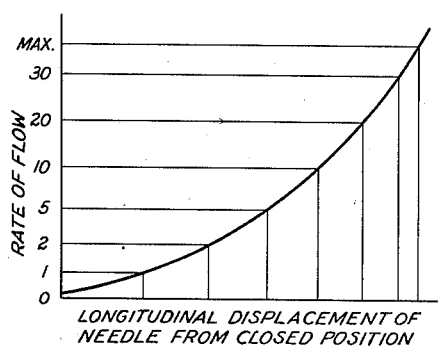
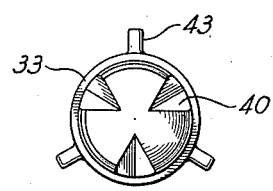

2,606,573

UNITED STATES PATENT OFFICE 2,606,573

ADJUSTABLE VENTURI ASSEMBLY

William M. Brobeck, Berkeley, and John G. Dorward, Jr., Albany, Calif., assignors to the United States of America as represented by the United States Atomic Energy Commission Application December 29, 1948, Serial No. 67,988

1 Claim. (Cl. 138—41)

This invention relates to flow control apparatus and more particularly to a new and improved flow control indicator assembly for use under widely variable fluid flow conditions. As one type of use for which the invention is well adapted the cooling of electrical apparatus having electrical coils in parallel and operable under variable loads may be taken as an example. In the event that the prescribed amount of heat transfer coolant is not constantly supplied to such coils while in operation, widespread damage may quickly ensue as a result of overheating. Moreover, when it is necessary to supply a different amount of coolant, as when the electrical apparatus is working under a heavier or lighter electrical loading, a simple and easily adjustable flow control apparatus is highly desirable. Such requirements are in no way unique with this particular usage however, and in its broader aspects the present invention is adapted for use wherever an accurate and easily adjustable flow of fluid medium, either as a gas or a liquid, is desired.

Generally, the use of separately attachable flow measuring or control means in connection with Venturi tubes has necessitated the construction of such means for use under a specified set of conditions. Size of the Venturi tube, pressures to be expected, volume of fluid to be measured and type of fluid handled usually dictate the choice of the measuring or control means and the means chosen for use in one installation frequently is unsuitable for use under a different set of conditions. This difficulty is especially true in cases where an adjustable Venturi tube is to be employed. In contrast, however, with this recognized limitation of conventional flow control structures, this invention now makes possible the use of a preadjusted standard indicator means on any conventional fluid flow system for which such a means is desired.

One object of the present invention is to provide a universal type of flow control indicator which may be preadjusted and used in combination with any enclosed fluid flow system in which an appreciable change in velocity of flow exists between two adjacent points along the system.

A second object is to provide an adjustable Venturi tube which will operate with uniform accuracy under a wide range or under a narrow range of volumes of liquid flow.

Another object is to provide a new and improved adjustable Venturi tube.

Another object is to provide a new and improved means for adjusting the needle in a Venturi tube.

A further object is to provide a new and improved needle for use in a Venturi tube.

A still further object is to provide a new and improved combination of an adjustable Venturi tube and a universal flow control indicator.

Another object is to provide a new and improved scale for determining in conjunction with a universal flow control indicator the amount of fluid passing through an adjustable Venturi tube.

Other objects and advantages of the invention will become more apparent as the description proceeds when considered in connection with the accompanying drawings in which, Figure 1 is an elevation partly in section, showing the assembly with the adjustable needle in partially open position;

Fig. 2 is an elevation of the Venturi tube, partly in section, showing the needle in fully opened position, the connected flow control indicator not being shown;

Fig. 3 is a right-hand view of the assembly shown in Fig. 1;

Fig. 4 is a chart showing the general relation of rate of flow to needle displacement obtained in the operation of the apparatus shown in Fig. 1; and Fig. 5 is an end view of the adjustable needle.

As shown in Fig. 1, the flow control indicator may be of any conventional construction, as for example the type shown in U. S. Patent 1,899,672 to Clark. Eessentially the indicator, enclosed in a box-like housing generally designated 10, consists of two bellows structures 11 and 12, separately containing a suitable pressure medium, such as a compressible gas. Corresponding reservoirs 13 and 14 communicate with these bellows and are connected by openings 15 and 16 respectively to pressure spaces 17 and 18. The pressure spaces preferably contain a suitable liquid, serving to transmit to the gaseous pressure medium in the bellows pressures which are directly in proportion to the pressures existing in pressure spaces 17 and 18. Openings 19 and 20 in a Venturi tube 30 to which the flow control indicator is attached, and respectively located upstream from and at the throat of the tube, communicate in fluid-tight relation with said pressure spaces 17 and 18. In this way the indicator 10 is joined to an enclosed fluid flow system in which a differential pressure will exist, during use, between the points at which said openings leading to the indicator are connected.

As generally shown in Fig. 1 a movable member 21, joined to each bellows and located between the same is actuated in dependence upon the relative expansions of said bellows, resulting from the pressures in said openings 19 and 20. Member 21 controls the movement of an indicating arm 22 along a fixed scale 23 as by means of a suitable arm 24 fixed to member 21 and adapted to actuate a link 25, which in turn rotates a shaft 26 to which said indicating arm 22 is attached. As will be apparent to those skilled in the art, such a construction will, in cases wherein flow through an orifice is being measured at a substantially constant presssure differential, make it possible to measure directly on the scale 23 the amount of fluid passing through the orifice and such is usually the function of the conventional flow control indicator. In the present invention, however, the universal indicator 10 acts to indicate the percentage of a standard flow, capable of taking place under existing pressure conditions, rather than to measure an actual flow expressed in units, such as gallons. One manner in which such indicator may be preadjusted before being connected to the apparatus is as follows:

The manufacturer of the indicator 10, or any other party having available an enclosed fluid flow system with an orifice therein and a variable pumping means, attaches thereto the indicator to be adjusted so that a standard pressure differential, for example 8.0 inches of mercury, exists between the two openings 19 and 20 during the fluid flow. Preferably the opening 19 is connected on the upstream side of the orifice so that the higher pressure exists in bellows 11. At this time the volume of flow in the calibrating fluid flow system is taken as the standard flow and the indicating arm 22 is adjusted on scale 23 so as to read 100%, as shown in Fig. 3. Thereafter, without regard to pressure differential across the orifice the flow of fluid is decreased to an arbitrary fraction, such as 70%, of the standard flow which took place when the standard pressure differential existed, and the position of the arm 22 under this condition is marked upon the scale 23. Obviously, any other diminished volume of flow, or a series of such diminished volumes of flow, can be similarly calibrated on scale 23 as shown in Fig. 3. Following this calibration of the indicator, the pumping means is accelerated so as to provide a volume of flow greater than standard flow with commensurate increase of differential pressure across the tubes 19 and 20. Any arbitrary ratio of this increased pressure differential to the standard pressure differential such as 140% of the standard pressure differential, may then be recorded by marking upon scale 23 the position of arm 22 with respect to the scale under such conditions. As before, any additional increased differential pressure or pressures may be similarly indicated, if desired.

Thereafter, suitable contacts, generally shown at 27 and 28 in Fig. 1, may be set upon the adjusted indicator 10 so that whenever member 21 reaches positions corresponding to, for example, a flow of only 70% of the standard flow through an orifice or to a pressure differential equal to 140% of the standard pressure differential, a relay may be operated, an alarm sounded or any suitable other indication may be made. Electrical connections 29 shown generally in Fig. 1 may be used for such purposes.

As will now be evident, the indicator 10 is preadjusted for operation with any enclosed fluid flow system, having a pressure differential across an orifice.

Passing now to the apparatus with which such universal indicator 10 is normally to be employed, reference is made to Fig. 1 showing a Venturi tube body 30, having a throat-section 31 and an elongated upstream body section 32 in which an improved needle member 33 is adapted to move. Fluid introduced at inlet 34 passes into section 32, moves along needle 33 and leaves the Venturi tube at outlet 35. Threadedly engaged with the upstream end of body section 32 is a hollow bonnet assembly 36 the lower end of which terminates in a ring 37 closely engaging the interior of body section 32. Apertures in the lower portion of the bonnet permit fluid entering from inlet 34 to pass through a cylindrical screen 38 into the interior of the Venturi tube. As will be noted, inlet 34 may be located laterally of the main axis of the tube and screen 38 employed not only to remove foreign material from the fluid, but also to reduce the turbulence of the fluid flow.

Preferably, the nose of needle 33 is provided with an opening, aperture or similar means permitting the bleeding of fluid therethrough, as for example grooves 40, as best shown in Fig. 5. Moreover, the elongated shank of the needle preferably contains a helically threaded section 41 adapted to engage with a corresponding helical thread 42 with an appropriate pitch in the stationary bonnet assembly 36. As will be noted, a multiple thread is preferred in this connection in order to provide a compact arrangement. As a result of the above-described construction a rotatable and reciprocable needle for an adjustable Venturi tube is provided. Along the shank of the needle guide ribs 43 serving to hold the needle nose in proper relation to the Venturi throat and to reduce further the turbulence of the fluid flow before it reaches opening 19 may be employed. At the extreme end of the needle shank a suitable nut 44 clamping a calibrated hand wheel 45 to the needle is provided. A suitable packing gland 46 threadedly engaged with the upper end of bonnet 36 and surrounding the shank of the needle insures against leakage under high pressure operation and provides frictional engagement to hold the hand wheel in a desired position. As shown in Fig. 3 a pointer 47 attached at a suitable location to the Venturi tube body cooperates with a scale 48 preferably arranged helically on the hand wheel 45. Any suitable means for holding the needle and the hand wheel in a locked position may also be provided, as for example one or more set screws 49 which are loosened prior to rotation of hand wheel 45.

Having thus described the structure of the several independent parts of our improved flow control apparatus, the following description of its installation and operation will serve to disclose the novel cooperation of the same.

With the above-described preadjusted flow indicator 10 attached to the adjustable Venturi tube, helical scale 48 may first be calibrated by pumping fluid by any suitable means (not shown) through the assembly at a known rate, as for example, one gallon per minute flow and adjusting the connected hand wheel 45 and needle 33 until the indicator arm 22 reads 100%. Under these conditions the position of pointer 47 on scale 48 is marked as position 1. Flow is then reduced by 0.1 gallon per minute increments to the lowest tenth of a gallon found feasible, meanwhile maintaining a reading of 100% with the indicator arm 22, and appropriate gradations are marked upon scale 48 for each such increment.

At this time as the nose of needle 33 moves further into throat 31 of the Venturi tube it will be found that the ability of the fluid to flow through grooves 40 will necessitate an appreciable longitudinal displacement of the needle before such flow, at these low rates, is appreciably reduced. Consequently, the spacing between gradations upon scale 48 for the several increments at relatively low rates of flow remains relatively large and contributes to the accuracy of control at the low rates of flow, where in conventional equipment such accuracy is difficult to secure.

Similarly scale 48 is calibrated upwards from one gallon per minute to two gallons per minute of flow in increments of 0.2 gallon per minute and appropriate gradations are marked upon the scale. Likewise, from a rate of two gallons per minute to five gallons per minute increments of 0.5 gallon per minute are added to the scale, from a rate of five gallons per minute to ten gallons per minute increments of 1.0 gallon per minute are marked on the scale, from a rate of ten gallons per minute to thirty gallons per minute increments of two gallons per minute are marked on the scale and thereafter the flow at maximum open position of the needle (as shown in Fig. 2) is marked on the scale. As a result of such calibration it is found that when the linear distance along the helical scale 48 is plotted against gallons of flow per minute, a non-linear relation between the volume of flow and needle displacement, of the general character shown in Fig. 4 results, indicating the sensitivity of adjustments of the apparatus for changing the rate of flow. As will be apparent, the pitch of the helical threads 42, the shape of the nose of needle 33 and the fact that the pressure differential of the fluid flowing through tube 30 changes substantially in proportion to the square of the rate of its flow, all contribute to the accurate control of fluid flow by the needle adjustments in the above-described combination of apparatus.

With the apparatus thus calibrated and installed, the desired flow of fluid through the adjustable Venturi tube for a given set of working conditions is initiated by moving handwheel 45 to the prescribed point as indicated by pointer 47. Thereafter without varying the pumping means, the desired rate of flow through the Venturi tube may be secured merely by moving handwheel 45. Moreover, should an abnormality in the pumping system later develop, movement of the bellows 11 and 12 will cause the electrical warning system to function and prompt corrective action can then be taken by the operator before damage ensues. As a result of the above-described invention it will thus be apparent that a standard, conventional indicator unit 10 may be adapted for use across the orifices of any conventional enclosed fluid flow system without the necessity of designing the same for the characteristics of the system to which it is to be applied. Furthermore, a unit 10, when once preadjusted to provide for universal use, as above described may, whenever desired, be removed from installation on one Venturi tube and attached to another Venturi tube and continue to function without further adjustment. In addition, a given Venturi tube having once been calibrated for a definite flow with one preadjusted universal unit 10 may without further change have another such unit attached thereto in lieu of the original such unit and continue to function without further adjustment. In addition, a given Venturi tube having once been calibrated for a definite flow with one preadjusted universal unit 10 may without further change have another such unit attached thereto in lieu of the original such unit and continue to function without further adjustment. In addition, a given Venturi tube and connected universal unit 10 may, when desired, be removed from location on one set of piping and installed upon another set of piping and continue to function with accuracy.

It will be understood that we intend to include variations and modifications of the invention and that the foregoing is in no wise to be construed as limitations upon the invention, the scope of which is defined in the appended claim.

What is claimed is:

In an adjustable Venturi tube adapted for use in a flow control apparatus employing a preadjusted universal flow indicator connected to said tube, a throat section, an inlet opening for said tube in a side wall thereof above said throat section, a longitudinally movable rotatable needle having a cylindrical lower portion terminating in a generally conical nose portion, a groove in said needle extending from said lower portion through said conical nose portion for gradually producing variations of flow in the range of the small volumes of flow, a threaded member affixed to said tube, said member having an apertured extension disposed across said inlet opening, a screen positioned across said aperture, a threaded section on said needle engaging said threaded member, and means affixed to said needle for facilitating manual rotation and concurrent linear displacement thereof.

WILLIAM M. BROBECK.
JOHN G. DORWARD, Jr.

REFERENCES CITED

The following references are of record in the file of this patent:

UNITED STATES PATENTS

| Number | Name | Date |
| --- | --- | --- |
| 963,643 | Pendleton | July 5, 1910 |
| 1,744,872 | Earl | Jan. 28, 1930 |
| 1,899,672 | Clark | Feb. 28, 1933 |
| 1,929,973 | Haley | Oct. 10, 1933 |
| 2,007,051 | Hirvonen | July 2, 1935 |
| 2,051,307 | Lorraine | Aug. 18, 1936 |
| 2,061,852 | Schweitzer | Nov. 24, 1936 |
| 2,106,300 | Harrison | Jan. 25, 1938 |
| 2,240,119 | Montgomery | Apr. 29, 1941 |
| 2,333,030 | Meyer | Oct. 26, 1943 |
| 2,436,319 | Meyer | Feb. 17, 1948 |